(12) United States Patent
Montfort et al.

(10) Patent No.: US 9,605,991 B2
(45) Date of Patent: Mar. 28, 2017

(54) FLOATING MECHANICAL LEVEL SENSOR

(71) Applicant: XEROX CORPORATION, Norwalk, CT (US)

(72) Inventors: David D. Montfort, Webster, NY (US); Rodolfo E. Valladares, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 271 days.

(21) Appl. No.: 14/242,494

(22) Filed: Apr. 1, 2014

(65) Prior Publication Data

US 2015/0276466 A1    Oct. 1, 2015

(51) Int. Cl.
| | |
|---|---|
| *G01F 23/76* | (2006.01) |
| *G01F 23/30* | (2006.01) |
| *G01F 23/00* | (2006.01) |
| *G01F 23/56* | (2006.01) |

(52) U.S. Cl.
CPC .......... *G01F 23/76* (2013.01); *G01F 23/0038* (2013.01); *G01F 23/30* (2013.01); *G01F 23/303* (2013.01); *G01F 23/56* (2013.01)

(58) Field of Classification Search
CPC ...... G01F 23/76; G01F 23/0038; G01F 23/56; G01F 23/30; G01F 23/303
USPC ................. 73/305, 313, 306, 311, 309, 322.5
See application file for complete search history.

(56) References Cited

U.S. PATENT DOCUMENTS

| | | | |
|---|---|---|---|
| 2,586,619 A * | 2/1952 | Davis ...................... | G01F 23/50 |
| | | | 137/429 |
| 2,666,823 A | 1/1954 | Wilson | |
| 3,693,649 A | 9/1972 | Gordon et al. | |
| 3,857,004 A | 12/1974 | Kavthekar et al. | |
| 4,289,154 A * | 9/1981 | Quayle ............... | A47L 15/4244 |
| | | | 134/183 |
| 5,000,044 A | 3/1991 | Duffy et al. | |
| 5,148,709 A | 9/1992 | Ross, Jr. | |
| 5,524,487 A * | 6/1996 | Liu ......................... | G01F 23/68 |
| | | | 73/313 |
| 5,586,466 A | 12/1996 | Steiner | |
| 5,743,138 A | 4/1998 | Cheng | |
| 6,195,013 B1 | 2/2001 | Robinson | |
| 6,253,611 B1 * | 7/2001 | Varga ...................... | G01F 23/76 |
| | | | 73/319 |
| 6,783,518 B2 | 8/2004 | Takahashi et al. | |

(Continued)

FOREIGN PATENT DOCUMENTS

| | | |
|---|---|---|
| WO | 2008120222 | 10/2008 |
| WO | 2012160096 | 11/2012 |

*Primary Examiner* — Marrit Eyassu
(74) *Attorney, Agent, or Firm* — Gibb & Riley, LLC

(57) ABSTRACT

Devices and methods for a vertical float system. A float guide, located in a tank containing a fluid, has first and second sections with a first diameter and a third section between the first and second section. The third section has a smaller, second diameter. A float is slidably attached to the float guide in the third section. The system includes a switch and a level sensor located in the first section or the second section. The switch becomes activated when the float contacts the level sensor. One of an inner face of the float and the third section of the float guide has projections arranged in a contiguous pattern around the one of the inner face of the float and the third section of said float guide. The projections are shaped to establish point contacts between the float and the float guide in the third section.

20 Claims, 6 Drawing Sheets

(56) References Cited

U.S. PATENT DOCUMENTS

| | | |
|---|---|---|
| 7,284,422 B1 | 10/2007 | Thompson |
| 7,284,427 B2 | 10/2007 | Calabrese |
| 8,181,518 B1 | 5/2012 | Donehue |
| 8,360,335 B2 | 1/2013 | Gross |
| 8,365,758 B2 | 2/2013 | Maiocco |
| 8,562,638 B2 | 10/2013 | Sokolov et al. |
| 8,640,930 B2 | 2/2014 | Nunez et al. |
| 2010/0307237 A1* | 12/2010 | Prasad .................. H01H 36/02 73/313 |
| 2013/0027833 A1 | 1/2013 | Rabe et al. |

* cited by examiner

FIG. 3
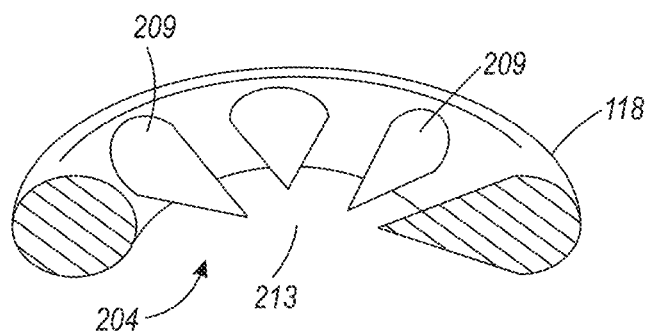
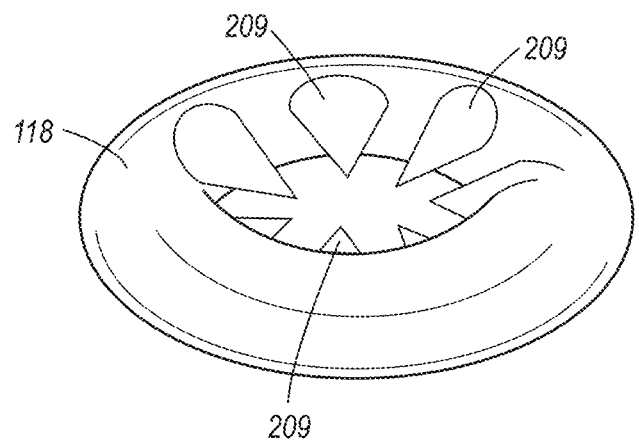
FIG. 4

FLOATING MECHANICAL LEVEL SENSOR

BACKGROUND

Devices and methods herein generally relate to floating level sensors and, more particularly, to a floating mechanical level sensor having reduced contact area.

Float sensors are well known in technologies requiring liquid level sensing. They are typically employed to indicate when a fluid container is nearly full or nearly empty. Most float level sensors include a shaft that has substantially circular cross-section on which moves a float with a circular hole in the center. In some float level sensors multiple floats move up and down at different positions on a shaft to determine different level ranges; sensors associated with the floats provide signals representing levels in the different ranges. In other instances, a single float is provided with a vertical linear movement dependent upon the level range to be monitored.

SUMMARY

Disclosed herein is a level sensor having a shaped float assembly that is less susceptible to malfunctioning due to submersion in a tacky or viscous liquid. An internal shape of the float assembly includes projections that provide a point contact area between the buoyancy device and the alignment shaft where build up can occur which could prevent relative movement between the buoyancy device and the alignment shaft.

According to a device herein, a float guide comprises a first section having a first diameter, a second section having the first diameter, and a third section between the first section and the second section. The third section is cylindrical and has a second diameter. The second diameter is smaller than the first diameter. A float is slidably attached to the float guide in the third section. The float comprises an inner diameter and an outer diameter. The outer diameter is larger than the inner diameter. The inner diameter is larger than the second diameter and smaller than the first diameter. An inner face of the float comprises radially inwardly extending projections arranged in a contiguous pattern around the inner face. The projections are shaped to establish point contacts between the float and the float guide in the third section. The device includes a switch and a level sensor located in the first section or the second section. The switch is activated when the float contacts the level sensor.

According to another device herein, a float guide comprises a first section having a first diameter, a second section having the first diameter, and a third section between the first section and the second section. The third section has a second diameter. The second diameter is smaller than the first diameter. A float is slidably attached to the float guide in the third section. The float comprises an outer diameter and a substantially circular inner diameter. The outer diameter is larger than the inner diameter. The inner diameter is larger than the second diameter and smaller than the first diameter. The third section of the float guide comprises radially outwardly extending projections arranged in a contiguous pattern around the third section. The projections are shaped to establish point contacts with an inner face of the float in the third section. The device includes a switch and a level sensor located in the first section or the second section. The switch is activated when the float contacts the level sensor.

According to a vertical float system herein, a float guide is located in a tank containing a fluid. The float guide comprises a first section having a first diameter, a second section having the first diameter, and a third section between the first section and the second section. The third section has a second diameter smaller than the first diameter. A float is slidably attached to the float guide in the third section. The float comprises a material sized and configured to float on the fluid. The system includes a switch and a level sensor located in the first section or the second section. The switch becomes activated when the float contacts the level sensor. The float comprises an inner diameter and an outer diameter. The outer diameter is larger than the inner diameter. The inner diameter is larger than the second diameter and smaller than the first diameter. One of an inner face of the float and the third section of the float guide comprises projections arranged in a contiguous pattern around the one of the inner face of the float and the third section of said float guide. The projections are shaped to establish point contacts between the float and the float guide in said third section.

These and other features are described in, or are apparent from, the following detailed description.

BRIEF DESCRIPTION OF THE DRAWINGS

Various examples of the devices and methods are described in detail below, with reference to the attached drawing figures, which are not necessarily drawn to scale and in which:

FIG. 3 is a perspective cross-sectional view of a float taken along line 3-3 of FIG. 2A;

FIG. 4 is an enlarged perspective view of a float according to devices and methods herein;

DETAILED DESCRIPTION

Figure 1:
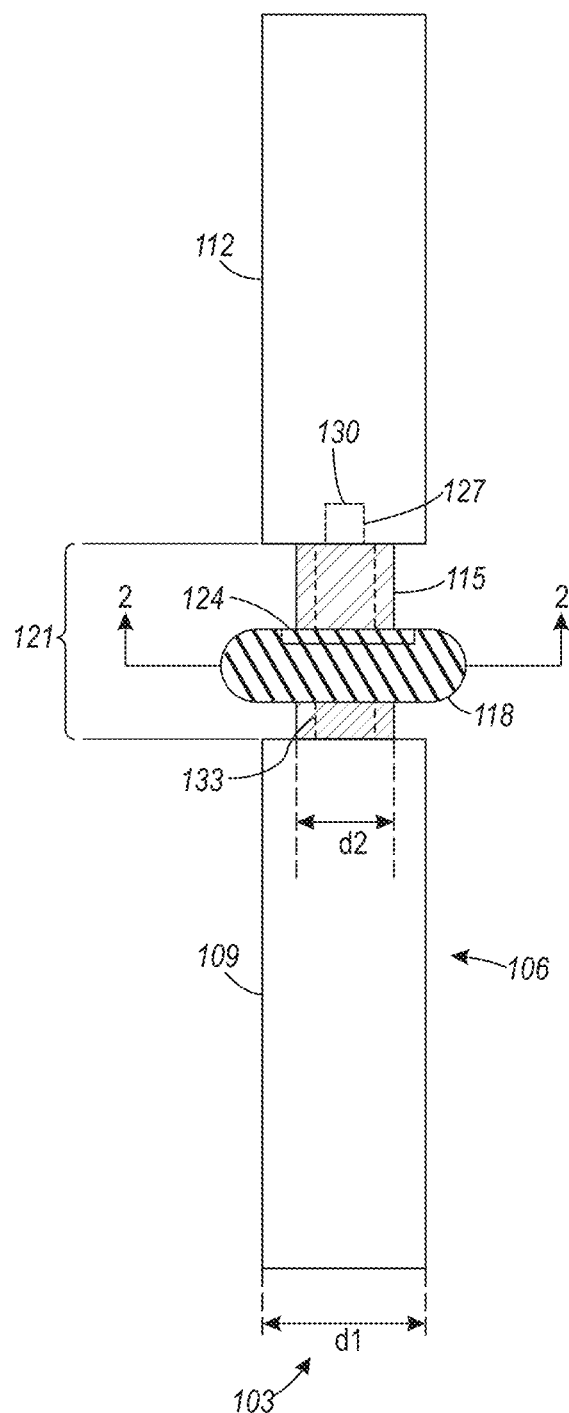
FIG. 1 is a side view of a float assembly according to devices and methods herein.

The disclosure will now be described by reference to a floating mechanical level sensor that enables point contact between the float device and the float guide. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. In the drawings, like reference numerals have been used throughout to identify identical elements.

According to devices and methods herein, a vertical float system is used to activate a level sensor in a holding tank. The liquid level sensor consists of a vertical cylindrical float switch. The switch is actuated when the liquid level raises the float to the contact position, that is, it floats with the liquid.

Devices and methods herein eliminate/minimize the chance for a level sensor to fail by allowing the float to move freely in order to actuate the level sensor properly. Devices and methods herein eliminate/minimize built up of flocculating substances between the float and the travel area in the float guide. The float guide serves the purpose of structural support for the float, and it houses the electrical components along with an actuator that activates the level sensor. The float carries the actuator, which triggers the level sensor, thus alarming for high or low level, as desired.

Referring to the drawings, FIG. 1 shows a float assembly, indicated generally as 103, according to devices and methods herein. The float assembly 103 comprises a float guide 106. The float guide 106 has a first section 109. The diameter of the first section 109 may be a certain diameter, indicated as d1. The float guide 106 has a second section 112. The diameter of the second section 112 may be the same as the diameter of the first section 109; that is, d1. The float guide 106 also has a third section 115. The diameter of the third section 115 may be a certain diameter, indicated as d2. The diameter d2 is smaller than the diameter d1.

The float assembly 103 may include a mounting bracket to mount the float assembly 103 inside a liquid container.

Figure 2A:
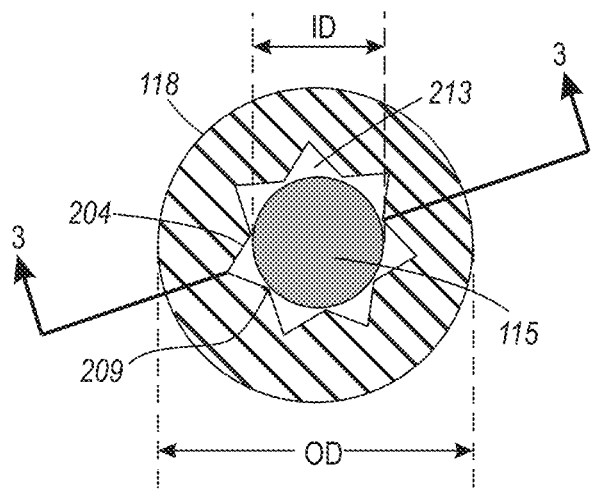
FIGS. 2A and 2B are cross-sectional views of a float taken along line 2-2 of FIG. 1.
Figure 2B:
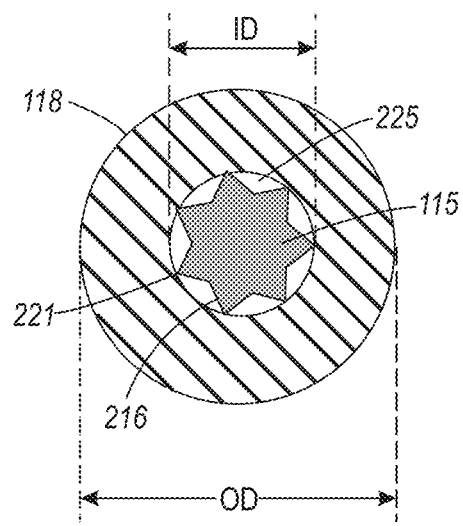

A float 118 is slidably attached to the float guide 106 in the third section 115. The float 118 comprises an inner diameter ID and an outer diameter OD, as shown in FIGS. 2A and 2B. The outer diameter OD is larger than the inner diameter ID. Furthermore, the inner diameter ID is slightly larger than the second diameter d2, but smaller than the first diameter d1 of the float guide 106. The float 118 is sized and configured to be able to move up and down within the travel area, indicated as 121.

According to devices and methods herein, the float 118 may comprise a disk of a generally annular or toroidal shape. As shown in FIG. 2A, the inner face 204 of the float 118 is shaped to minimize contact between the float 118 and the float guide 106 in the third section 115. A plurality of radially inwardly extending projections 209 is located in a contiguous pattern around the inner face 204. The projections 209 may comprise cones or pyramids that are pointed at their distal ends to establish single point contacts with the float guide 106 in the third section 115. In cross-section, such as shown in FIG. 2A, the inner face 204 of the float may resemble a star shape having several vertices formed by the projections 209. FIG. 3 is a cross-sectional view of an exemplary float 118 according to devices and methods herein. The vertices alternate between joining outward- and inward-pointing pairs of edges leaving gaps 213 between the projections 209. The gaps 213 may extend deeply into the float 118 in order to prevent a thick or sticky substance from impeding movement of the float 118 in the travel area 121. Note: in the cross-section shown in FIG. 2A, the third section 115 of the float guide 106 may be cylindrical in shape. In some cases, the projections 209 may comprise rounded bumps, such as hemispheres, arranged contiguously around the inner face 204. If the projections 209 comprise bumps, it is contemplated that only a tangential point of the projection contacts the float guide 106 in the third section 115. The point contact of the projections 209 on the float guide 106 in the third section 115, in cooperation with the gaps 213 between the projections 209 minimizes friction and facilitates free movement for the float 118 with respect to the travel area 121.

As shown in FIG. 2B, the float guide 106 may be shaped in the third section 115 to minimize contact between the inner face 204 of the float 118 and the outer face 216 of that portion of the float guide 106. A plurality of radially outwardly extending projections 221 is arranged in a contiguous pattern around the outer face 216 of the float guide 106 in the third section 115. The projections 221 may comprise triangular vertices that are pointed at their distal ends to establish single point contacts with the float guide 106 in the third section 115. In cross-section, such as shown in FIG. 2B, the outer face 216 may resemble a star shape having several vertices formed by the projections 221. The vertices alternate between joining outward- and inward-pointing pairs of edges leaving gaps 225 between the projections 221, similar to the gaps 213 described above. The gaps 225 may extend deeply into the float guide 106 in the third section 115 in order to prevent a thick or sticky substance from impeding movement of the float 118 in the travel area 121. Note: in the cross-section shown in FIG. 2B, the inner face 204 of the float 118 may be cylindrical in shape and rounded such that only a tangential point of the inner face 204 contacts the projections 221 of the float guide 106 in the third section 115.

FIG. 4 is a perspective view of an exemplary float 118 according to devices and methods herein. The float 118 may be hollow inside and have a density of about 80% of the liquid in which it will be used. The float 118 may be sized and configured to generate substantial buoyant and gravitation forces to maximize operational reliability.

Figure 5:
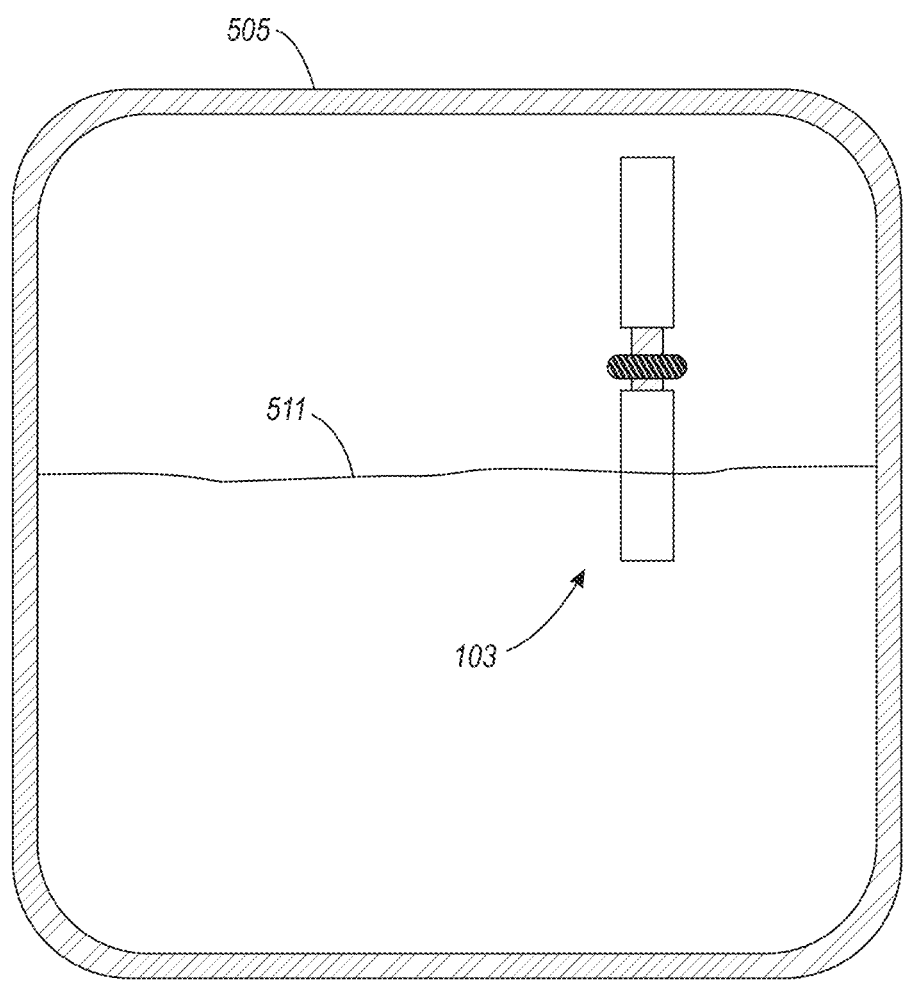
FIG. 5 is an elevational view of a tank containing a float assembly according to devices and methods herein.

FIG. 5 shows a float assembly 103 installed in a tank 505. The float assembly 103 responds to changing levels of a fluid 511 in the tank 505. According to devices and methods herein, the float 118 may include an actuating device 124, such as a magnet or other appropriate device, to cooperate with a level sensor 127 in order to actuate a switch 130. Motion of the float 118 carries the actuating device 124 against the level sensor 127. As shown in FIG. 1, the level sensor 127 may be located in the second section 112 in order to sense a high level. It is contemplated that the level sensor 127 may be located in the first section 109 in order to sense a low level. The level sensor 127 may comprise a switch 130, such as a reed switch or other appropriate switch, positioned so that the switch 130 changes state, generally closes, when the float 118 and actuating device 124 are positioned adjacent the level sensor 127. A change in level of the fluid 511 may cause the float 118 and actuating device 124 to move away from the level sensor 127 and switch 130, resulting in opening of the switch 130.

Figure 6:
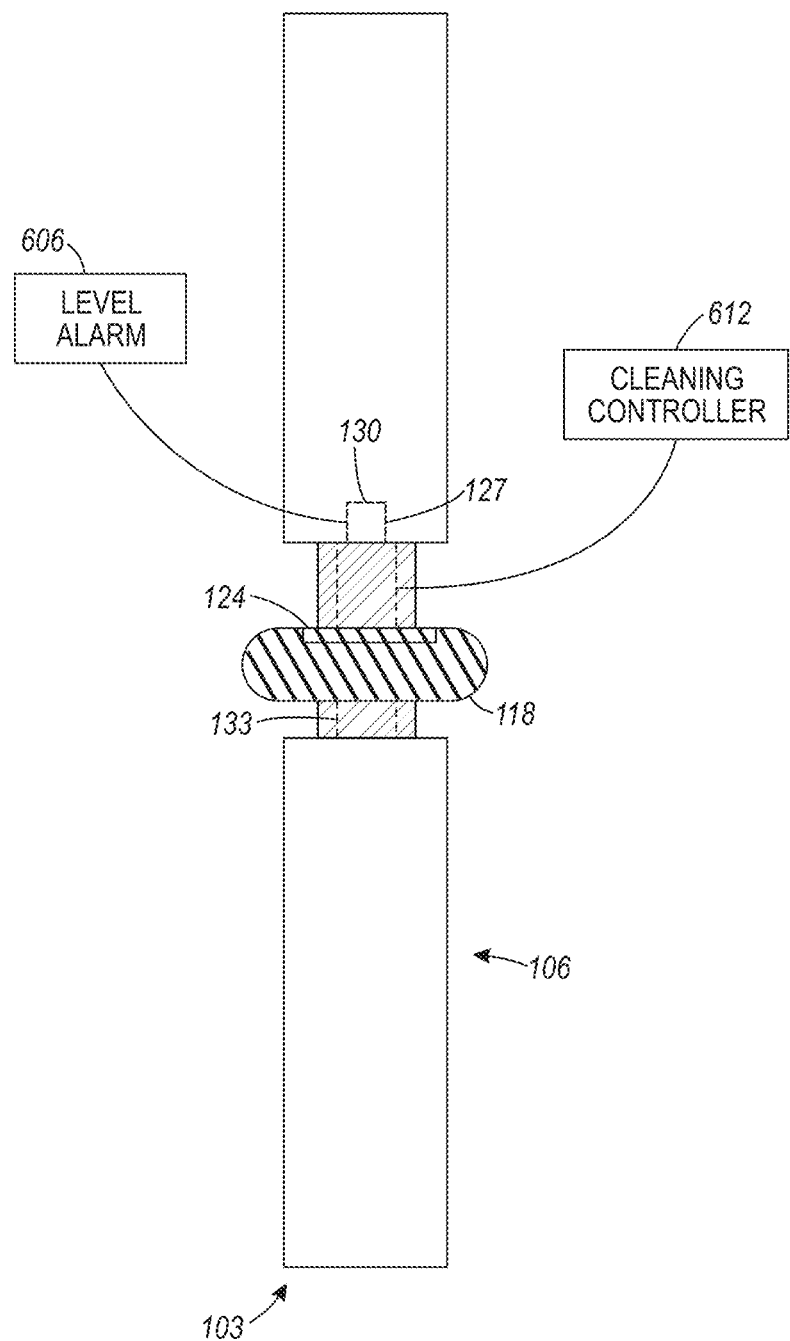
FIG. 6 is a schematic illustration of a level sensor according to devices and methods herein.

Referring to FIG. 6, it should understood by one of ordinary skill in the art that the level sensor 127 may comprise an electromechanical sensor as part of the float assembly 103 to determine the actual level of fluid 511 at a certain fixed position in the tank 505 determined by the location of the level sensor 127 along the float guide 106. Once the float 118 reaches a certain predetermined level, the actuating device 124 actuates the switch 130. According to devices and methods herein, the switch 130 may trigger a level alarm 606, a pump, or other function according to the level of the fluid 511 in the tank 505.

Sometimes, during the treatment process of the fluid 511 in the tank 505, one or more substances may be added to the fluid 511 to flocculate the fluid. The substance may adhere to the components of the float assembly 103 and obstruct movement of the float 118, rendering the level sensor 127 inoperable. An excessive accumulation of the flocculating substance may build up on the float 118 and/or the level sensor 127, and more specifically, in the travel area 121 for the float 118. This impedes contact of the actuating device 124 to the level sensor 127; thus, the level sensor 127 may not activate the switch 130 for the level alarm 606, pump, or other component/feature.

According to devices and methods herein, the float assembly 103 may include a cleaning device 133 that cleans the travel area 121. A cleaning controller 612 attached to the cleaning device 133 may automatically initiate a cleaning process. It is contemplated that the cleaning device 133 may comprise a variety of electromechanical mechanisms. For example, the cleaning controller 612 may periodically pulse the travel area 121 with an ultrasonic device, such as an ultrasonic transducer, or vibrate it with a high-speed solenoid. The cleaning device 133 may use vibrations to prevent material build-up on portions of the float guide 106 and facilitate translation of the float 118 in the travel area 121 along the third section 115 of the float guide 106.

According to a vertical float system herein, a float assembly 103 is located in a tank 505 containing a fluid 511. The float assembly 103 includes a float guide 106 comprising a first section 109 having a first diameter d1, a second section 112 having the first diameter d1, and a third section 115 between the first section 109 and the second section 112. The third section 115 has a second diameter d2 smaller than the first diameter d1. A float 118 is slidably attached to the float guide 106 in the third section 115. The float 118 comprises a material sized and configured to float on the fluid. The system includes a switch 130 and a level sensor 127 located in the first section 109 or the second section 112. The switch 130 becomes activated when the float 118 contacts or comes proximate the level sensor 127. The float 118 comprises an inner diameter ID and an outer diameter OD. The outer diameter OD is larger than the inner diameter ID. The inner diameter ID is larger than the second diameter d2 and smaller than the first diameter d1. The inner face 204 of the float 118 and the third section 115 of the float guide 106 are shaped to minimize contact between the float 118 and the float guide 106 in the third section 115.

Figure 7:
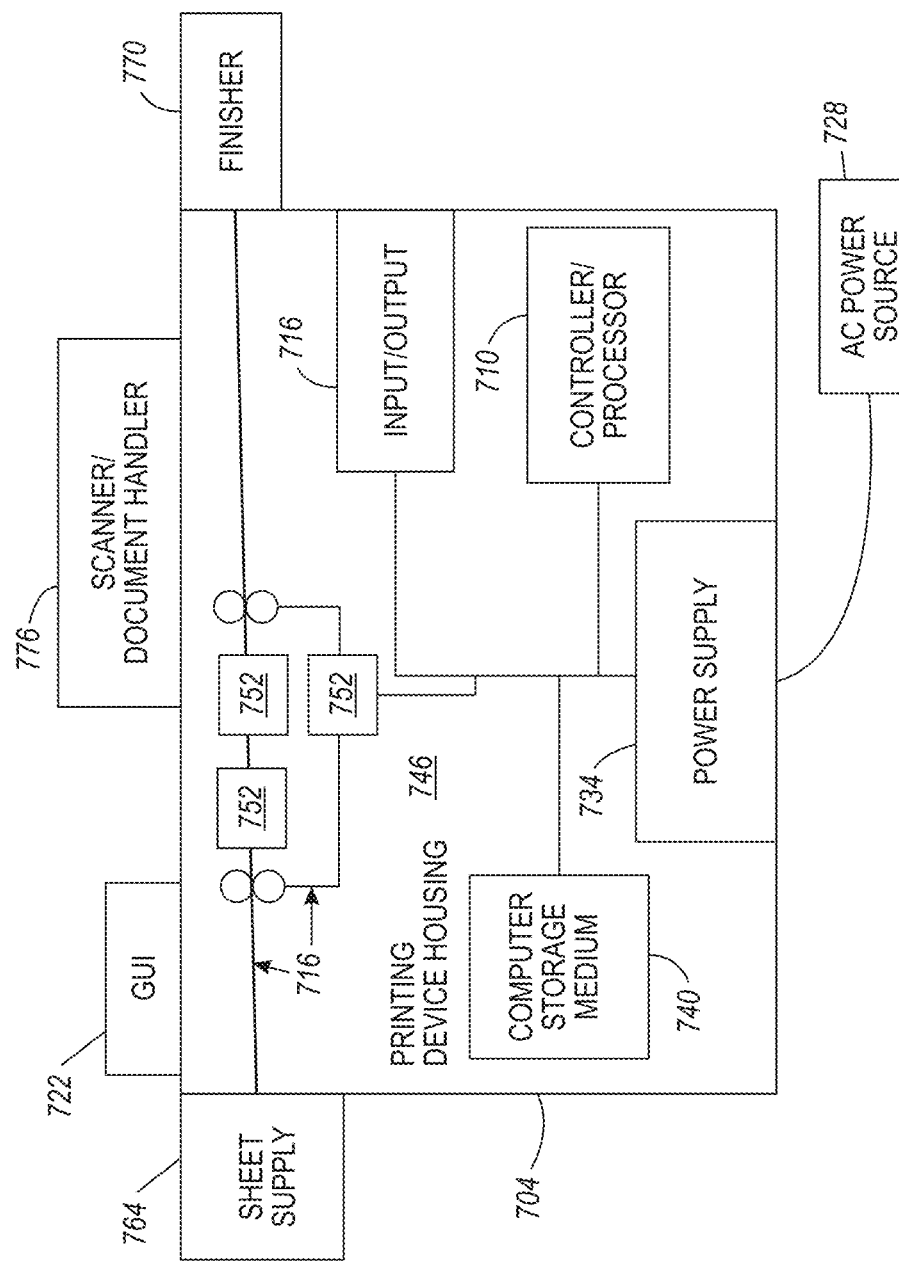
FIG. 7 is a side-view schematic diagram of a multi-function device according to devices and methods herein.

FIG. 7 illustrates a multi-function device 704 that can be used with devices and methods herein and can comprise, for example, a printer, copier, multi-function machine, etc. The multi-function device 704 includes a controller/processor 710 and a communications port (input/output) 716 operatively connected to the controller/processor 710 and to a network external to the multi-function device 704. In addition, the multi-function device 704 can include at least one accessory functional component, such as a graphic user interface (GUI) assembly 722 that operates on the power supplied from the AC power source 728, which may be external to the multi-function device 704. The AC power source 728 may provide electrical power through the power supply 734.

The controller/processor 710 controls the various actions of the multi-function device 704. A non-transitory computer storage medium device 740 (which can be optical, magnetic, capacitor based, etc.) is readable by the controller/processor 710 and stores instructions that the controller/processor 710 executes to allow the multi-function device 704 to perform its various functions, such as those described herein. Thus, as shown in FIG. 7, a device housing 746 has one or more functional components that operate on power supplied from the AC power source 728 by the power supply 734. The power supply 734 can comprise a power storage element (e.g., a battery) and connects to the AC power source 728, which may be external to the multi-function device 704. The power supply 734 converts the external power into the type of power needed by the various components.

The multi-function device 704 includes at least one marking device (printing engines) 752 operatively connected to the controller/processor 710. A media path 758 is positioned to supply sheets of media from a sheet supply 764 to the marking device(s) 752, etc. After receiving various markings from the printing engine(s), the sheets of media can optionally pass to a finisher 770 which can fold, staple, sort, etc., the various printed sheets. In addition, the multi-function device 704 can include at least one accessory functional component (such as a scanner/document handler 776, etc.) that also operates on the power supplied from the AC power source 728 (through the power supply 734).

As would be understood by those ordinarily skilled in the art, the multi-function device 704 shown in FIG. 7 is only one example. The devices and methods herein are equally applicable to other types of printing devices that may include fewer components or more components. For example, while a limited number of printing engines and paper paths are illustrated in FIG. 7, those ordinarily skilled in the art would understand that many more paper paths and additional printing engines could be included within any printing device used with devices and methods herein.

According to devices and methods herein, the container and float, switch, cleaning device, etc. may be used in any of the components that maintain fluid in the multi-function device 704.

The terminology used herein is for the purpose of describing particular devices and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms 'automated' or 'automatically' mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the devices and methods herein cannot be implied or imported from any above example as limitations to any particular order, number, position, size, shape, angle, color, or material.

What is claimed is:

1. A device, comprising:
a float guide comprising:
a first section having a first diameter;
a second section having said first diameter; and
a third section between said first section and said second section, said third section being cylindrical and having a second diameter, said second diameter being smaller than said first diameter;
a float slidably attached to said float guide in said third section such that said float surrounds said float guide only in said third section, said float comprising an inner diameter and an outer diameter, said outer diameter being larger than said inner diameter, said inner diameter being larger than said second diameter and smaller than said first diameter,
an inner face of said float comprising radially inwardly extending projections arranged in a contiguous pattern around said inner face, said projections being shaped to establish point contacts between said float and said float guide in said third section;
a switch; and
a level sensor located in said first section or said second section, said switch being activated when said float contacts said level sensor.

2. The device according to claim 1, said float guide being located inside a liquid container.

3. The device according to claim 1, said float comprising a disk having an annular or toroidal shape.

4. The device according to claim 1, said projections comprising triangular vertices that are pointed at their distal ends.

5. The device according to claim 4, said projections being triangular shaped in transverse cross section, vertices of said projections engaging said float guide in said third section at a point.

6. The device according to claim 4, said projections comprising pyramids, cones, or bumps.

7. The device according to claim 1, further comprising a cleaning device operatively connected to said float guide, said cleaning device periodically cleaning said float guide.

8. The device according to claim 7, said cleaning device comprising an ultrasonic device or a high-speed vibrating solenoid.

9. A device, comprising:
a float guide comprising:
a first section having a first diameter;
a second section having said first diameter; and
a third section between said first section and said second section, said third section having a second diameter, said second diameter being smaller than said first diameter;
a float slidably attached to said float guide in said third section such that said float surrounds said float guide only in said third section, said float comprising an outer diameter and a circular inner diameter, said outer diameter being larger than said inner diameter, said inner diameter being larger than said second diameter and smaller than said first diameter,
said third section of said float guide comprising radially outwardly extending projections arranged in a contiguous pattern around said third section, said projections being shaped to establish point contacts with an inner face of said float in said third section;
a switch; and
a level sensor located in said first section or said second section, said switch being activated when said float contacts said level sensor.

10. The device according to claim 9, said float guide being located inside a liquid container.

11. The device according to claim 9, said float comprising a disk having an annular or toroidal shape.

12. The device according to claim 9, said projections comprising triangular vertices that are pointed at their distal ends.

13. The device according to claim 12, said projections being triangular shaped in transverse cross section, vertices of said projections engaging said float at a point.

14. The device according to claim 9, further comprising a cleaning device operatively connected to said float guide, said cleaning device periodically cleaning said float guide.

15. The device according to claim 14, said cleaning device comprising an ultrasonic device or a high-speed vibrating solenoid.

16. A vertical float system, comprising:
a float guide located in a tank containing a fluid, said float guide comprising:
a first section having a first diameter;
a second section having said first diameter; and
a third section between said first section and said second section, said third section having a second diameter, said second diameter being smaller than said first diameter, said float guide being attached to a wall within said tank;
a float slidably attached to said float guide in said third section such that said float surrounds said float guide only in said third section, said float comprising a material sized and configured to float on said fluid;
a switch; and
a level sensor located in said first section or said second section,
said switch becoming activated when said float contacts said level sensor,
said float comprising an inner diameter and an outer diameter, said outer diameter being larger than said inner diameter, said inner diameter being larger than said second diameter and smaller than said first diameter, and
one of an inner face of said float and said third section of said float guide comprising projections arranged in a contiguous pattern around said one of said inner face of said float and said third section of said float guide, said projections being shaped to establish point contacts between said float and said float guide in said third section.

17. The vertical float system according to claim 16, said float comprising a disk having an annular or toroidal shape.

18. The vertical float system according to claim 16, said projections comprising triangular vertices that are pointed at their distal ends.

19. The vertical float system according to claim 18, said projections being triangular shaped in transverse cross section, vertices of said projections engaging said one of said inner face of said float and said third section of said float guide at a point.

20. The vertical float system according to claim 16, further comprising a cleaning device operatively connected to said float guide, said cleaning device comprising an ultrasonic device or a high-speed vibrating solenoid periodically vibrating said float guide.

\* \* \* \* \*